United States Patent
Gross et al.

(10) Patent No.: US 6,802,003 B1
(45) Date of Patent: Oct. 5, 2004

(54) METHOD AND APPARATUS FOR AUTHENTICATING CONTENT

(75) Inventors: Mark T. Gross, Portland, OR (US); David M. Barth, Portland, OR (US); Richard P. Mangold, Forest Grove, OR (US)

(73) Assignee: Intel Corporation, Santa Clara, CA (US)

( * ) Notice: Subject to any disclaimer, the term of this patent is extended or adjusted under 35 U.S.C. 154(b) by 790 days.

(21) Appl. No.: 09/608,274

(22) Filed: Jun. 30, 2000

(51) Int. Cl.[7] .............................. H04L 9/18; H04L 9/00
(52) U.S. Cl. ....................................... 713/175; 713/201
(58) Field of Search .............................. 713/200, 201, 713/175, 176

(56) References Cited

U.S. PATENT DOCUMENTS 6,398,245 B1 * 6/2002 Gruse et al. ................. 280/228
6,408,330 B1 * 6/2002 DeLaHuerga ................ 709/217
6,502,194 B1 * 12/2002 Berman et al. .............. 713/201

OTHER PUBLICATIONS

SDMI Portable Device Specification, Part 1, Version 1.0; PDWG Los Angeles; Jul. 8, 1999, pp. 1–35.

* cited by examiner

Primary Examiner—Matthew Smithers
Assistant Examiner—Tremayne Norris
(74) Attorney, Agent, or Firm—Michael R. Barre

(57) ABSTRACT

Content is authenticated by generating signature certificates for content that has been successfully watermark screened. When a request is received for importation of content into a secured domain, a search is made in a signature certificates cache for a signature certificate associated with that requested content. If an identified signature certificate authenticates the requested content, the content is imported into the secured domain. If no signature certificate is identified, the content is watermark screened. If the content successfully passes the watermark screening process, a new signature certificate is then added to the signature certificate cache.

23 Claims, 5 Drawing Sheets

METHOD AND APPARATUS FOR AUTHENTICATING CONTENT

BACKGROUND

Digital audio content is downloaded and played on a computer using an application such as an MP3 player. MP3 is short for MPEG Layer 3 (Moving Pictures Expert Group) and refers to a format for storing digital audio.

A Secure Digital Music Initiative (SDMI) has been formed to prevent unauthorized copying and playing of digital audio content. SDMI compliant systems are any device, software application, or any other system that conforms to the requirements of the SDMI specification. Version 1.0 of the SDMI Portable Device Specification Part 1, document No. pdwg99070802, was published on July 8, 1999.

Most SDMI compliant software and hardware devices being introduced onto the market today import content into an SDMI Local Environment before storing the content on the computer. The SDMI Local Environment refers to a subset of the environment where all SDMI rules and behaviors are obeyed. One SDMI rule is that unencrypted content must be watermark screened before the content may be stored in the SDMI Local Environment. Importing content directly into the SDMI Local Environment is beneficial to a user because this time-consuming watermark screening process required by SDMI is only done once at storage rather than each time the content is downloaded to a device.

Importing unencrypted content directly into the SDMI Local Environment requires that the content be encrypted as SDMI content to remain persistently on the user's computer after watermark screening. Storing encrypted content introduces several usability problems for the user. Once the digital content is encrypted in the SDMI Local Environment, SDMI default usage rules restrict the user's ability to copy the SDMI content to non-SDMI devices. However, a user may want to use the digital content on both SDMI compliant devices and non-SDMI compliant devices. Because of the SDMI restrictions, the user has to store one SDMI encrypted copy of the content for the SDMI compliant devices and store one unencrypted copy of the content for use with the non-SDMI compliant devices. Storing both encrypted and non-encrypted content files wastes computer disk space and prevents interoperability of any one content file with all content players.

The present invention addresses this and other problems associated with the prior art.

DETAILED DESCRIPTION

Figure 1:
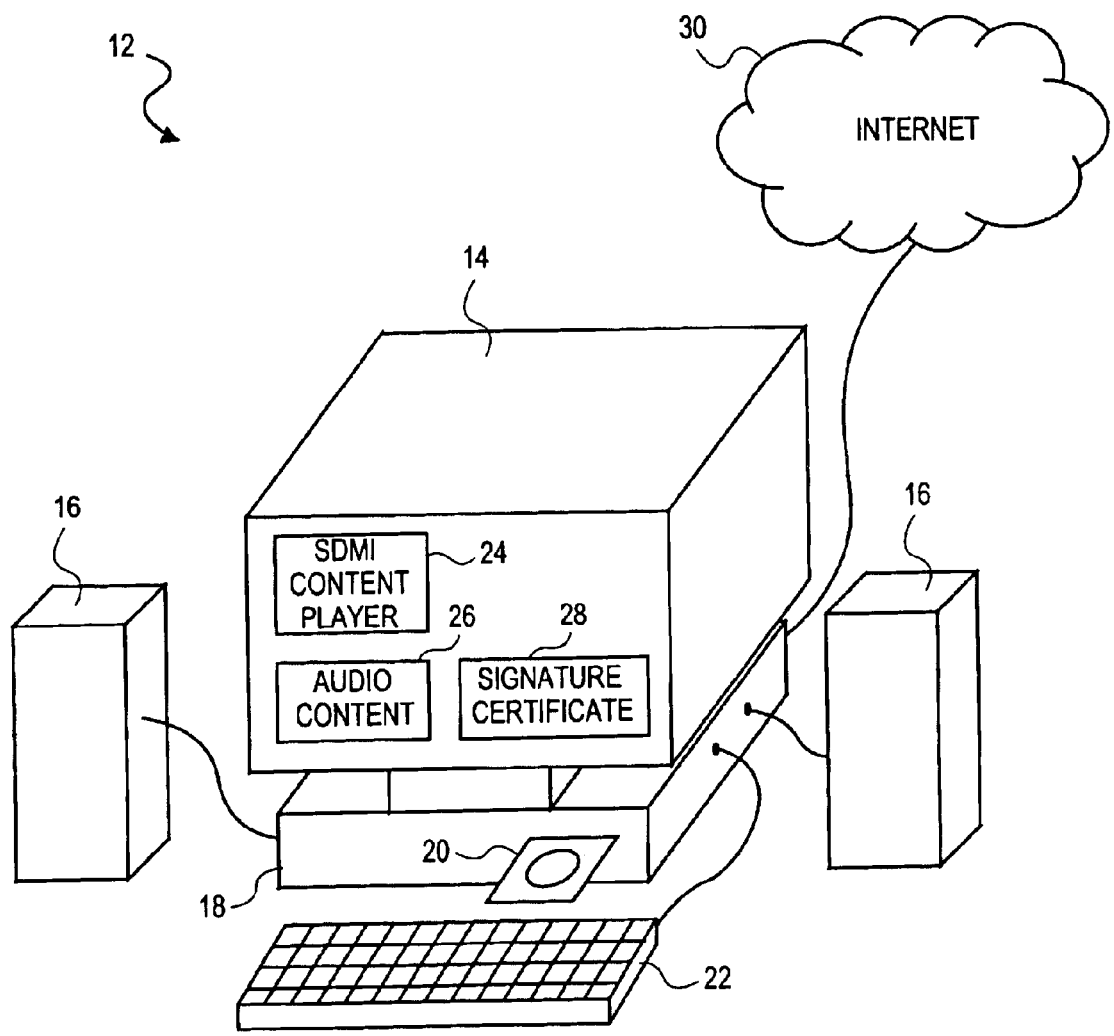
FIG. 1 is a diagram showing how a computer system authenticates content using signature certificates.

FIG. 1 shows a computer system 12 that includes a computer 18, screen 14, keyboard 22, speakers 16 and compact disc player 20. The computer system 12 may be connected to the Internet 30 or any other wide area or local area networks. The computer screen 14 shows an icon for a Secure Digital Music Initiative (SDMI) compliant content player 24 (SDMI application) stored in computer 18. In one example, the SDMI content player 24 is an MP3 Jukebox player. The computer screen 14 also shows an icon for an audio content file 26 stored in computer 18. The content in one embodiment is an MP3 audio file. However, the invention is applicable to any content that requires authentication.

The audio content 26, video content or any other type of content may be downloaded onto the computer system 12 from the Internet 30, from a compact disc loaded into compact disc player 20, or from any other storage medium. While FIG. 1 shows a computer system 12, the invention is applicable to any system capable of storing content and then playing or downloading that content to a user. For example, the invention may be integrated into a stereo system.

A third icon on screen 14 shows a signature certificate 28. In one instance, the signature certificate 28 authenticates that the audio content 26 has been screened for an SDMI watermark. The watermark screening is done at the time audio content 26 is stored in computer 18. But the audio content 26 is not imported into the SDMI Local Environment until the time of download to a SDMI compliant device or until time of playback by the SDMI content player 24. This technique allows the audio content 26 to remain in the same non-encrypted format it was in prior to watermark screening.

The SDMI usage rules do not come into effect until the content 26 is downloaded to a device or played back by the SDMI content player 24. The content 26 is prevented from being imported into the SDMI Local Environment until the content is first authenticated by the signature certificate 28. Authentication means that a signature certificate was created from content that successfully passed the SDMI watermark screening process and that signature certificate was derived from the same content that is currently being requested for importation into the SDMI Local Environment. If signature certificate 28 authenticates the audio content 26, the audio content 26 is played back through speakers 16, or if requested, downloaded to a portable device (not shown).

Watermark screening may not be necessary if the content 26 is going to be played on certain content players. For example, content players that only play content directly out on the speakers 16. The audio content 26 for these content players may be played without prior certificate authentication.

Usability problems are avoided because the same unencrypted audio content 26 may be used for both SDMI compliant devices, such as SDMI content player 24, and non-SDMI complaint devices. Thus, a SDMI encrypted copy and a non-encrypted copy of the same content do not have to be stored on computer system 12. Authentication of content 26 is also faster because the watermark screening process is only performed once at initial content download, instead of each time the content is imported into the SDMI Local Environment. This makes the watermark screening process essentially invisible to a user.

Figure 2:
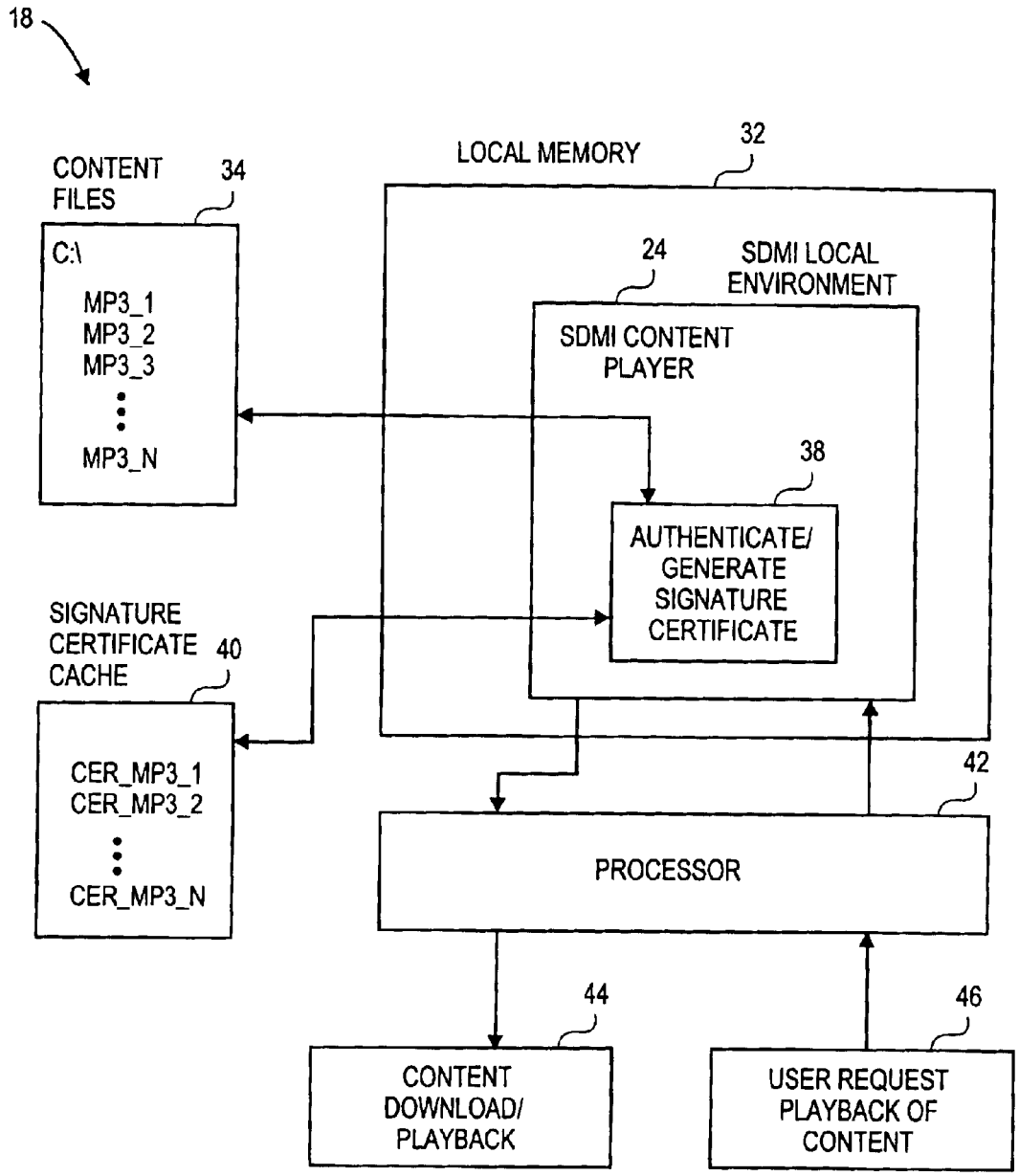
FIG. 2 is a block diagram showing in further detail how the computer of FIG. 1 authenticates content using the signature certificates.

FIG. 2 is a more detailed block diagram of the computer 18 shown in FIG. 1. Content files 34 and a signature certificate cache 40 are stored on a computer hard disk or other memory storage device. The SDMI content player 24 is loaded into local memory 32 and plays only SDMI compliant content in content files 34. In other words, the SDMI content player 24 operates within the SDMI Local Environment.

The SDMI content player 24 includes software 38 that authenticates and generates signature certificates for the content files 34. A processor 42 receives user requests 46 to playback selected audio content. Pursuant to the user requests 46, the processor 42 initiates certificate authentication/generation software 38. If the content file 34 selected for authentication is authenticated by one of the signature certificates in cache 40, the selected content is played back through output 44 or downloaded to a portable device.

The signature certificates in cache 40 may be given names that associate them with corresponding content files 34. The signature certificate names may be the same as the content files 34 with an additional extension. For example, the content files 34 are shown with file names MP3_1, MP3_2, . . . etc. The signature certificates associated with these content files may be given the file names CER_MP3_1, CER_MP3_2, . . . etc. Alternatively, the signature certificates may be described according to the number of bits in the compressed portion of the associated content file 34. The processor 42 searches for any signature certificates in cache 40 having the same name, or alternative identifying the same number of bits, as the selected content file 34. Any other type of naming convention that associates the signature certificates with the content files 34 may also be used.

Figure 3:
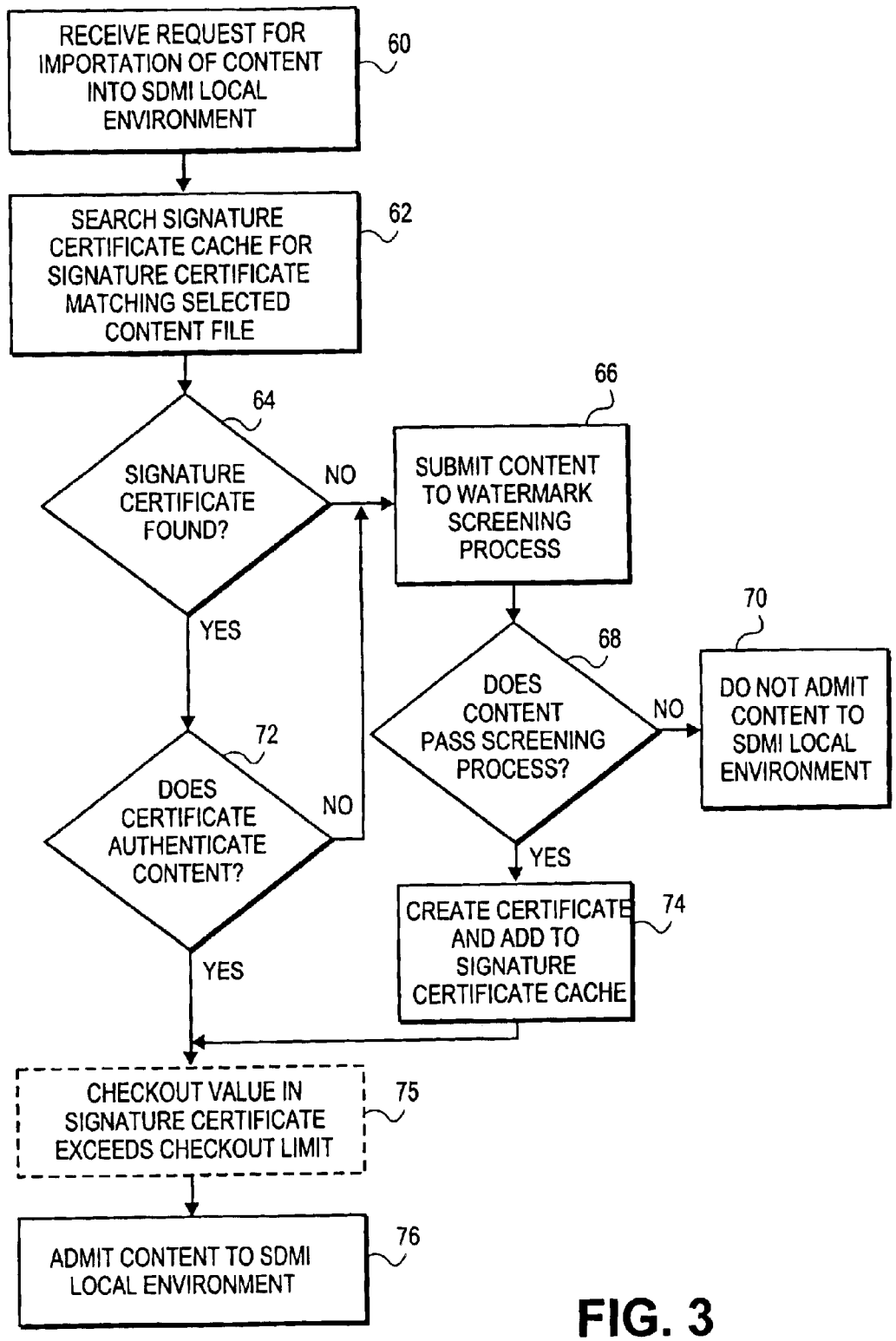
FIG. 3 is a flow diagram showing in further detail how signature certificates are used to authenticate content.

FIG. 3 shows how the signature certificates are used to authenticate watermark screening of the audio content. A user in block 60 requests importation of clear content into the SDMI Local Environment for playback on a secure SDMI compliant device or application. Clear content is content that has not been encrypted. In one case the clear content is an MP3 file. The signature certificates cache is searched in block 62 for a signature certificate having a descriptor associated with the selected content.

Each signature certificate in the cache is associated with a content file that has previously passed the SDMI watermark screening process. If a signature certificate is found in decision block 64, then that signature certificate is used to authenticate the selected content. If the identified signature certificate authenticates the content in decision block 72, the content is admitted into the SDMI Local Environment in block 76. This means the content may be played or downloaded by the SDMI compliant application.

Optionally SDMI default copy restrictions may be incorporated. The SDMI rules may restrict the number of copies of a particular content file that may be checked out to portable devices. This SDMI rule may optionally be implemented in block 75 by storing a value in the signature certificate tracking how many copies of the associated content have been checked out to portable devices. If the value in the signature certificate does not violate a maximum allowable check out value in block 75, the content is admitted to the SDMI local environment in block 76. This allows implementation of the SDMI copy restrictions without using encrypted content.

If no signature certificate is found in the cache in decision block 64, the content is submitted to the SDMI watermark screening process in block 66. Watermarks are analog signals incorporated into uncompressed audio content. Using signal processing techniques, the watermark screening process detects the watermark audio tones in the audio content. Watermark screening decompresses the audio file into Pulse Code Modulate (PCM) data. Signal processing routines are then applied to the PCM data to detect the watermark tones. Watermark screening is known and is therefore not described in further detail.

If the content does not pass the watermark screening process in decision block 68, the content is not admitted to the SDMI Local Environment in block 70. This means the content will not be played by the SDMI content player. If the content passes the watermark screening process in decision block 68, a signature certificate is created for the compressed content file and added to the signature certificate cache in block 74. The content is then admitted into the SDMI Local Environment in block 76.

Figure 4:
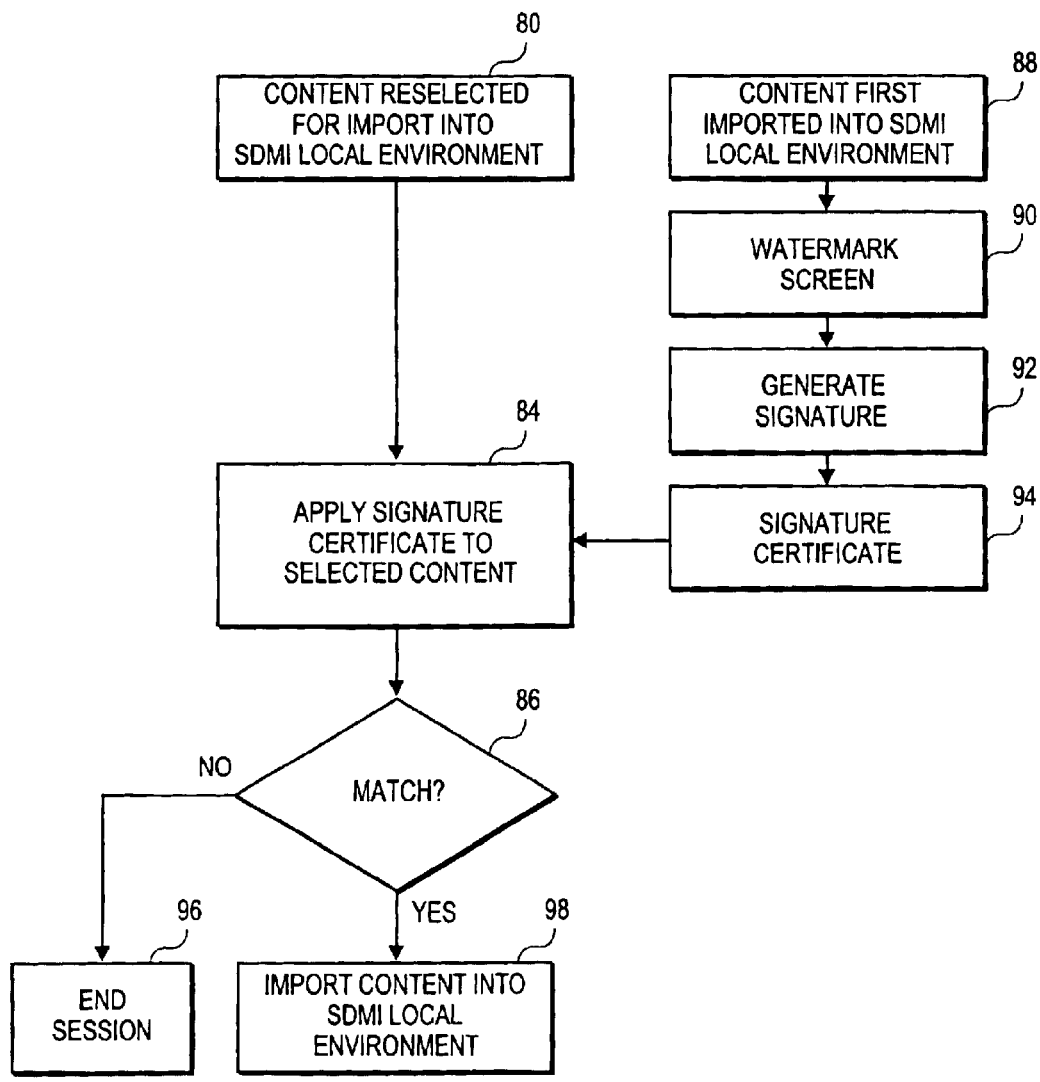
FIGS. 4 and 5 are flow diagrams showing different techniques for authenticating content.

FIG. 4 describes in further detail how the signature certificates are first generated and how selected content is authenticated with the signature certificates in block 72 (FIG. 3). Signature certificates are digital signatures that securely verify the content as the same unaltered content that previously passed the watermark screening process. One example of a digital signature algorithm is a Media Digest 5 (MD5) hash that generates a string of bits as a function of the source content and an encryption key. The certificate represents the string of bits output from the MD5 hash.

Block 88 represents the first time content is imported either into the computer or requested to be imported into the SDMI Local Environment. Since the content has never before been imported into the SDMI Local Environment, the content is watermark screened in block 90. If the content successfully passes watermark screening, a signature certificate 94 is generated for the content in block 92. The signature is derived from the bits of the content file as originally downloaded on the computer. This content file could be in a digitally compressed format to reduce the amount of memory needed to store the content file.

Any time a user requests importation of that same content into the SDMI Local Environment, the authentication process starts at block 80. This time the content is not watermark screened. Instead the signature certificate 94 previously generated for that content is located in the signature certificate cache. That signature certificate 94 is applied to the content file in block 84 using a function that will return true or false if the content file is the same set of bits that was used to create the signature certificate 94.

If the content file contains the same set of bits originally used to generate the signature certificate in decision block 86, the content is authenticated as being the same content that previously passed the watermark screening 90. Accordingly, the content is imported into the SDMI Local Environment in block 98.

If SDMI copy rules are incorporated with the certification authentication scheme, the content will only be imported if the signature certificate also attests that the content has not already been checked out more than a predetermined number of times.

If the content file is not the same set of bits that generated the signature certificate, the content is not imported into the SDMI Local Environment and the session is terminated in block 96.

Certificate authentication does not require decompression of the MP3 content into a Pulse Code Modulated (PCM) format and complex watermark screening of that decompressed content before every content playback. Certificate authentication also does not require persistent storage of separate SDMI and non-SDMI versions of the same content in memory.

Figure 5:
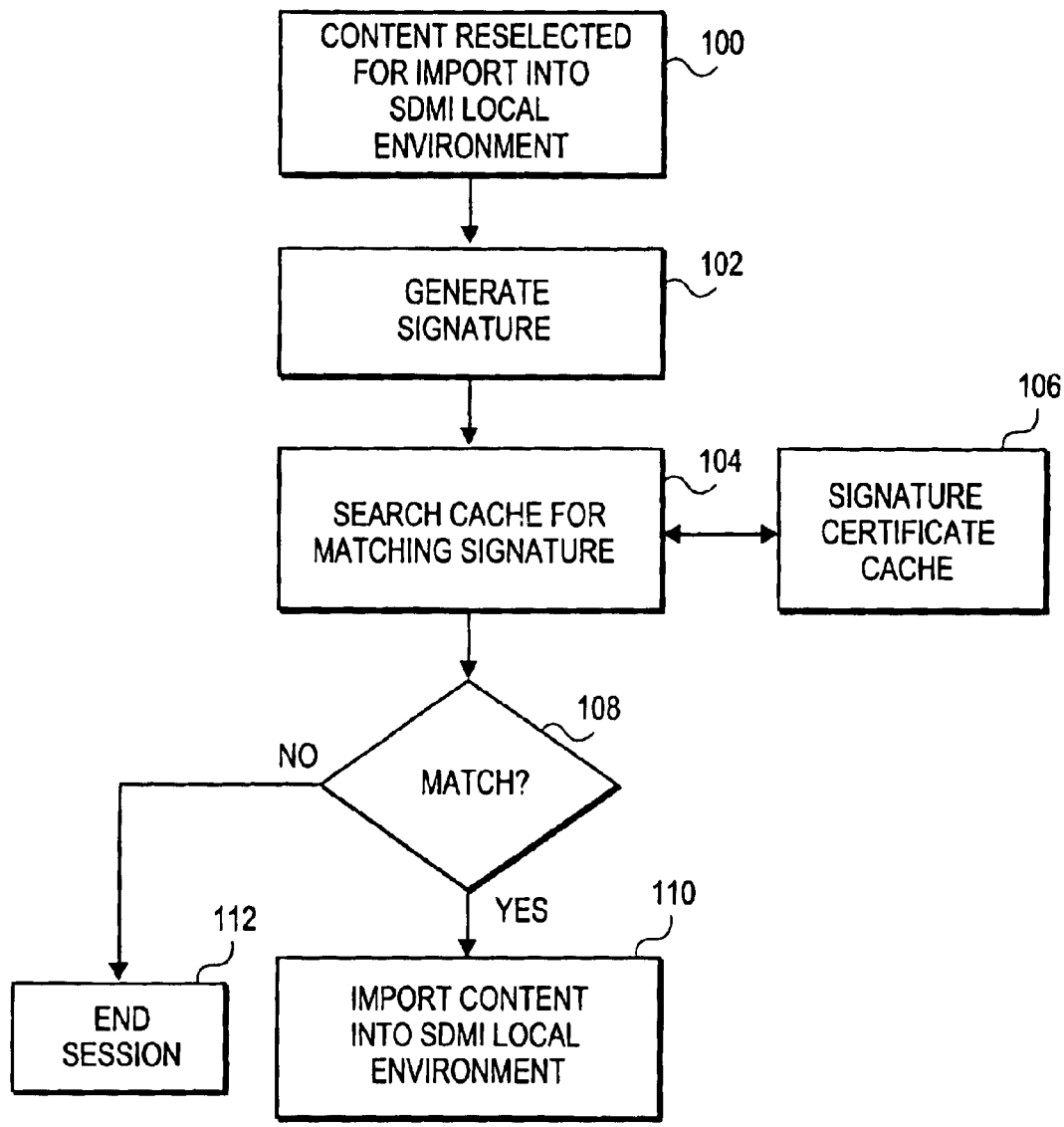

FIG. 5 is another variation on content authentication. After the watermark screening process and signature certificate generation, that same content is selected again for importation into the SDMI Local Environment in block 100. This time the same signature generation algorithm previously used for generating the signature certificate is again applied to the content in block 102. The content is not watermark screened prior to generation of this signature. Block 104 then searches the signature certificate cache 106 for any signature certificates matching the signature that was just derived for the content. If a match is found in decision block 108, the content is imported into the SDMI Local Environment in block 110. If no match is found, the content is not imported into the SMDI Local Environment and the session terminated in block 112.

Having described and illustrated the principles of the invention in a preferred embodiment thereof, it should be apparent that the invention may be modified in arrangement and detail without departing from such principles. I claim all modifications and variation coming within the spirit and scope of the following claims.

What is claimed is:

1. A method for authenticating content, comprising:
   authenticating content, through use of a watermark screening operation;
   if the content passes watermark screening, generating one or more signature certificates for the content that has been successfully watermark screened;
   receiving a request for importation of some of the content into a secured domain;
   searching for a signature certificate for the requested content; and
   importing the requested content into the secured domain when a signature certificate among the one or more signature certificates authenticates successful watermark screening of the requested content.

2. A method according to claim 1 including:
   submitting the requested content for watermark screening only when no signature certificate for the requested content is found;
   generating a signature certificate that uniquely identifies the requested content when the requested content successfully passes watermark screening; and
   adding the signature certificate to a signature certificate cache.

3. A method according to claim 1 including:
   receiving a second request to import the same content into the secured domain;
   searching a signature certificate cache for the signature certificate for the requested content; and
   importing the requested content into the secured domain without watermark screening when a signature certificate for the requested content is identified in the signature certificate cache.

4. A method according to claim 1 wherein the signature certificates are generated using a hash algorithm that uniquely identifies the content.

5. A method according to claim 1 where the secured domain comprises a device or application conforming with a Secure Digital Music Initiative.

6. A method according to claim 1 wherein watermark screening decompresses the content into Pulse Code Modulated digital audio data and detects authentication audio tones in the digital audio data.

7. A method according to claim 6 including generating the signature certificates from the content before the content is decompressed into the Pulse Code Modulated digital audio data.

8. A method according to claim 1 including:
   identifying one or more signature certificates corresponding with the requested content;
   applying the identified signature certificate to the requested content; and
   accepting the identified signature certificate as authentication that the selected content has been successfully watermark screened when a sequence of bits in the requested content matches a sequence of bits used to generate the identified signature certificate.

9. A method according to claim 1 including:
   generating a signature for the requested content;
   searching for a signature certificate that matches the signature; and
   authenticating the requested content as having been successfully watermark screened based on finding a signature certificate that matches the signature.

10. A method according to claim 1 including maintaining a value in the signature certificate that tracks a number of copies of the associated content that have been previously checked out and preventing importation of the associated content into the secured domain when the value in the signature certificate exceeds a checkout limit.

11. A system for authenticating content, comprising:
    memory to retain content files; and
    a processor to access the memory and to perform operations comprising:
    authenticating content, through use of a watermark screening operation;
    if the content passes watermark screening, generating one or more signature certificates for the content that has been successfully watermark screened;
    receiving a request for importation of some of the content into a secured domain;
    searching for a signature certificate for the requested content; and
    importing the requested content into the secured domain when a signature certificate among the one or more signature certificates authenticates successful watermark screening of the requested content.

12. A system according to claim 11 including an input adapted to receive requests for outputting selected content files, the processor conducting watermark screening of the selected content files only when a signature certificate does not authenticate the selected content files.

13. A system according to claim 11 including a speaker output that only plays content files authenticated with matching signature certificates.

14. A system according to claim 11 including a signature certificate cache adapted to retain the signature certificates for content files that have successfully passed watermark screening.

15. A system according to claim 11 including an application program residing in a local memory that causes the processor to authenticate the content files with the signature certificates before the application program plays or downloads the content files.

16. A system according to claim 11 wherein:
    the content includes content files;
    the processor receives the content files from a compact an optical disk player or from a network, and
    the processor watermark screens the received content files when the received content files are first loaded into the memory.

17. A system according to claim 11 wherein the memory and processor are located in a computer.

18. A system according to claim 11 wherein the memory and processor are embedded in a stereo.

19. Software for authenticating content, comprising:

a machine-readable medium; and instructions encoded in the machine-readable medium, wherein the instructions, when executed, cause the machine to perform operation comprising:

authenticating content, through use of a watermark screening operation;

if the content passes watermark screening, generating one or more signature certificates for the content that has been successfully watermark screened;

receiving a request for importation of some of the content into a secured domain;

searching for a signature certificate for the requested content; and importing the requested content into the secured domain when a signature certificate among the one or more signature certificates authenticates successful watermark screening of the requested content.

20. Software according to claim 19, wherein the instructions comprise:

code to submit the requested content for watermark screening when no signature certificate is found for the requested content;

code to generate a signature certificate that uniquely identifies the requested content when the requested content successfully passes watermark screening; and code to add the signature certificate to a signature certificate cache.

21. Software according to claim 19 wherein the instructions comprise:

code to receive additional requests to import the same content into the secured domain;

code to generate a content signature for the requested content;

code to search a signature certificate cache for a signature certificate matching the content signature; and code to import the requested content into the secured domain without watermark screening the requested content when a signature certificate in the signature certificate cache matches the content signature.

22. Software according to claim 19 wherein the signature certificates and the content are stored on a computer hard disk drive and the code that authenticates the requested content with the signature certificates is located in computer local memory.

23. Software according to claim 19 wherein the instructions that generate the signature certificates comprise a hash algorithm.

* * * * *

UNITED STATES PATENT AND TRADEMARK OFFICE
CERTIFICATE OF CORRECTION

PATENT NO.    : 6,802,003 B1
DATED         : October 5, 2004
INVENTOR(S)   : Gross et al.

It is certified that error appears in the above-identified patent and that said Letters Patent is hereby corrected as shown below:

Column 6,
Line 59, after "from", delete "a compact".

Signed and Sealed this

Twenty-first Day of June, 2005

JON W. DUDAS
*Director of the United States Patent and Trademark Office*